(12) United States Patent
Li

(10) Patent No.: US 12,531,621 B2
(45) Date of Patent: Jan. 20, 2026

(54) METHOD AND APPARATUS FOR DETERMINING DEFAULT BEAM, AND COMMUNICATION DEVICE

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 135 days.

(21) Appl. No.: 18/552,048

(22) PCT Filed: Mar. 30, 2021

(86) PCT No.: PCT/CN2021/084142
§ 371 (c)(1),
(2) Date: Sep. 22, 2023

(87) PCT Pub. No.: WO2022/205003
PCT Pub. Date: Oct. 6, 2022

(65) Prior Publication Data
US 2024/0178901 A1  May 30, 2024

(51) Int. Cl.
*H04L 23/02* (2006.01)
*H04B 7/06* (2006.01)
*H04L 5/00* (2006.01)
*H04W 72/1273* (2023.01)

(52) U.S. Cl.
CPC ......... *H04B 7/0695* (2013.01); *H04L 5/0053* (2013.01); *H04L 5/0092* (2013.01); *H04W 72/1273* (2013.01)

(58) Field of Classification Search
CPC ... H04L 5/0053; H04L 5/0044; H04L 5/0048; H04B 7/0695; H04B 7/088; H04B 7/0617; H04W 72/046; H04W 72/232; H04W 72/23
USPC ............................... 375/262, 160, 267, 299
See application file for complete search history.

(56) References Cited

U.S. PATENT DOCUMENTS

| | | | |
|---|---|---|---|
| 2019/0239212 A1 | 8/2019 | Wang et al. | |
| 2022/0311579 A1* | 9/2022 | Zhang | H04B 7/0695 |
| 2022/0312449 A1* | 9/2022 | Sun | H04L 5/0044 |
| 2023/0397204 A1* | 12/2023 | Yuan | H04B 7/0695 |
| 2024/0178901 A1* | 5/2024 | Li | H04B 7/0695 |

FOREIGN PATENT DOCUMENTS

CN    110167091 A    8/2019

OTHER PUBLICATIONS

The First Office Action for Chinese Application No. 202180000796.9, issued on May 13, 2022, 11 pages.
International Search Report and Written Opinion of International Application No. PCT/CN2021/084142, dated Jan. 4, 2022, 15 pages.

(Continued)

*Primary Examiner* — Khai Tran
(74) *Attorney, Agent, or Firm* — Finnegan, Henderson, Farabow, Garrett & Dunner, L.L.P.

(57) ABSTRACT

A method for determining a default beam, includes: determining one or multiple transmission configuration indication (TCI) states corresponding to a specific physical downlink control channel (PDCCH); and determining the default beam according to the one or multiple TCI states.

20 Claims, 5 Drawing Sheets

(56) References Cited

OTHER PUBLICATIONS

ZTE, "Details of latency and overhead reduction for beam management", 3GPP TSG RAN WG1 #96bis, R1-1904022, Xi'an, China, Apr. 8-12, 2019, 5 pages.
Extended European Search Report Issued in Application No. 21933683.1 dated Apr. 5, 2024, 18 pages.
"Discussion on MTRP for reliability", 3GPP TSG-RAN WG1 #104-e, R1-2101598, NTT Docomo, Inc, e-Meeting, Jan. 25-Feb. 5, 2021, 15 pages.
"Enhancements on Multi-TRP for PDCCH, PUCCH and PUSCH", 3GPP TSG RAN WG1 Meeting #104-e, Tdoc RI2101093, e-Meeting, Xiaomi, Jan. 25-Feb. 5, 2021, 19 pages.

* cited by examiner

METHOD AND APPARATUS FOR DETERMINING DEFAULT BEAM, AND COMMUNICATION DEVICE

CROSS-REFERENCE TO RELATED APPLICATION

This application is a U.S. national phase application of International Patent Application No. PCT/CN2021/084142, filed on Mar. 30, 2021, the entire contents of which are incorporated herein by reference.

FIELD

The present disclosure relates to the field of wireless communication technologies, and more particularly to a method for determining a default beam, an apparatus for determining a default beam, and a communication device.

BACKGROUND

In a new radio (NR), particularly when a communication band is in a frequency range 2, due to the fast attenuation of high-frequency channels, beam-based transmission and reception may be used to ensure the coverage of signals. At present, a beam indication signaling is sent to a terminal device by a network side device, and the terminal device determines a sending beam or a receiving beam according to the beam indication signaling, so that the terminal device may communicate with the network side device based on the sending beam and the receiving beam.

However, when the network side device does not send the beam indication signaling, how the terminal device determines the sending beam or the receiving beam is crucial.

SUMMARY

A method for determining a default beam provided in a first aspect of the present disclosure includes determining one or multiple transmission configuration indication (TCI) states corresponding to a specific physical downlink control channel (PDCCH), and determining the default beam according to the one or multiple TCI states.

A communication device provided in a second aspect of the present disclosure includes a transceiver, a memory, and a processor connected to the transceiver and the memory, respectively, and configured to control wireless signal transmission and reception of the transceiver and being capable of implementing the method for determining the default beam provided in the first aspect of the embodiment of the present disclosure, by executing computer-executable instructions on the memory.

A computer storage medium is provided in a third aspect of the present disclosure. The computer storage medium having stored therein computer-executable instructions that, when executed by a processor of a communication device, cause the communication device to perform the method for determining the default beam provided in the first aspect.

BRIEF DESCRIPTION OF THE DRAWINGS

Example embodiments will be described in detail below in conjunction with the accompanying drawings.

DETAILED DESCRIPTION

Figure 1:
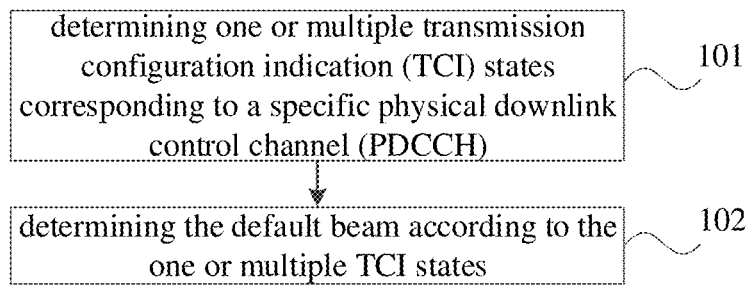
FIG. 1 is a flow chart of a method for determining a default beam provided in an embodiment of the present disclosure.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with embodiments of the present disclosure. Instead, they are merely examples of apparatuses and methods consistent with aspects related to the embodiments of the present disclosure as recited in the appended claims.

Terms used herein in embodiments of the present disclosure are only for the purpose of describing specific embodiments, but should not be construed to limit the embodiments of the present disclosure. As used in the embodiments of the present disclosure and the appended claims, "a/an" and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in the embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" and "in case that" may be construed to mean "when" or "upon" or "in response to determining" depending on the context.

Embodiments of the present disclosure are described in detail below, examples of which are illustrated in the accompanying drawings. The same or similar reference numerals represent the same or similar elements throughout the descriptions. The embodiments described below with reference to the accompanying drawings are illustrative, are intended to explain the present disclosure and cannot be construed as limiting the present disclosure.

At present, a network side device sends a beam indication signaling to a terminal device, and the terminal device determines a sending beam or a receiving beam according to the beam indication signaling.

The beam indication signaling includes a medium access control-control element (MAC CE) signaling and a downlink control information (DCI) signaling in a R15/16 protocol. For a beam configured for a physical uplink control channel (PUCCH) transmission, the network side device may indicate it through a radio resource control (RRC) signaling or a RRC signaling+a MAC CE signaling. The beam configured for the PUCCH transmission, that is, uplink beam information, may also be referred to as a spatial setting or information of spatial relation info.

When the network side device does not send an indication signaling configured to indicate the beam configured for transmitting the PUCCH, the beam configured for the PUCCH transmission needs to use a same beam corresponding to a control resource set (CORESET) with a smallest CORESET identifier (ID) on a primary cell (PCell), and a beam of the CORESET is indicated by a transmission configuration indication (TCI) state. A quasi co-location (QCL) type D included in the TCI state indicates spatial reception parameter information, that is, beam information.

However, when the CORESET with the smallest CORESET ID is configured with two TCI states, which TCI state or two TCI states corresponds to the beam configured for the PUCCH transmission is a difficult problem to be solved urgently.

In view of the above-mentioned problems, the present disclosure provides a method for determining a default beam, an apparatus for determining a default beam, and a communication device.

FIG. 1 is a flow chart of a method for determining a default beam provided in an embodiment of the present disclosure. The method for determining the default beam may be applied to a terminal device.

The terminal device may be a device that provides voice and/or data connectivity to a user, a handheld device with a wireless connection function, or other processing devices connected to a wireless modem, etc. In different systems, names of a user equipment (UE) may be different. For example, in a 5G system, the terminal device may be referred to as a UE. A wireless terminal device may communicate with one or more core networks (CNs) via a radio access network (RAN). The wireless terminal device may be a mobile terminal device, such as a mobile phone (or referred to as a "cellular" phone), and a computer with a mobile terminal device, such as a portable, pocket-sized, handheld, built-in computer or vehicle-mounted mobile device, which exchange language and/or data with the wireless access network.

For example, the terminal device may be a personal communication service (PC) telephone, a cordless telephone, a session initiated protocol (SIP) telephone, a wireless local loop (WLL) station, a personal digital assistant (PDA) and other devices. The wireless terminal device may also be referred to as a system, a subscriber unit, a subscriber station, a mobile station, a mobile, a remote station, an access point, a remote terminal, an access terminal, a user terminal, a user agent, and a user device, which is not limited in the embodiment of the present disclosure.

As shown in FIG. 1, the method for determining the default beam may include steps as follows.

In step 101, one or multiple transmission configuration indication (TCI) states corresponding to a specific physical downlink control channel (PDCCH) are determined.

In step 102, the default beam is determined according to the one or multiple TCI states.

In an embodiment of the present disclosure, the default beam may be configured for the transmission of at least one of a physical downlink control channel (PDCCH), a physical uplink control channel (PUCCH), a physical uplink shared channel (PUSCH), a physical downlink shared channel (PDSCH), or a reference signal. The reference signal may include a channel state information reference signal (CSI-RS), and a sounding reference signal (SRS). When the default beam is configured for the transmission of the PUCCH, the PUCCH may be configured for the transmission of at least one of a hybrid automatic repeat request acknowledgement (HARQ ACK) feedback, a channel state information (CSI) feedback, and a scheduling request (SR).

In an implementation, when the beam corresponds to an uplink transmission, the default beam may be spatial relation info, a spatial setting, or a spatial parameter.

In the embodiment of the present disclosure, the terminal device may determine the one or multiple TCI states corresponding to the specific PDCCH, and determine the default beam according to the one or multiple TCI states corresponding to the specific PDCCH. Therefore, in case that the terminal device does not receive a beam indication signaling sent by a network side device, the terminal device may also determine the default beam, so as to communicate with the network side device based on the default beam, thus improving the communication success rate.

The method for determining the default beam is provided in the embodiment of the present disclosure. The one or multiple TCI states corresponding to the specific PDCCH are determined by the terminal device, and the default beam is determined according to the one or multiple TCI states corresponding to the specific PDCCH. Therefore, in case that the terminal device does not receive the beam indication signaling sent by the network side device, the terminal device may also determine the default beam, so as to communicate with the network side device based on the default beam, thus improving the communication success rate.

The network side device takes a base station as an example. The base station may include multiple cells that provide services for a user equipment (UE). Depending on different specific applications, each cell may contain multiple transmission reception points (or referred to as transmit/receive points, TRPs). Each TRP may contain one or more antenna panels, or may be a device in an access network that communicates with a wireless terminal device through one or more sectors on an air interface, or other names. For example, the base station involved in the embodiment of the present disclosure may be a base transceiver station (BTS) in a global system for mobile communication (GSM) or a code division multiple access (CDMA), a NodeB in a wide-band code division multiple access (WCDMA), and an evolutional Node B (abbreviated as an eNB, or an e-NodeB) in a long term evolution (LTE) system, a 5G base station (abbreviated as an gNB) in a 5G network architecture (next generation system), a home evolved Node B (HeNB), a relay node, a home base station (femto), or a pico base station (pico), etc, which is not limited in the embodiment of the present disclosure.

Figure 2:
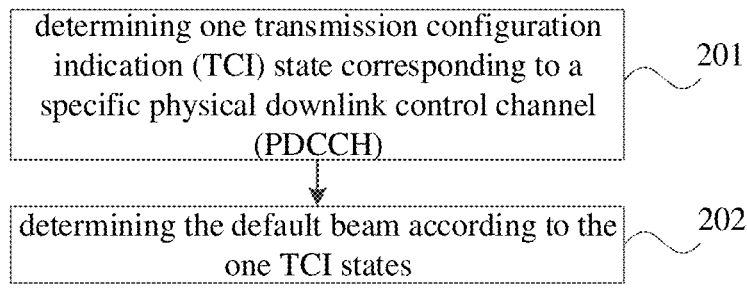
FIG. 2 is a flow chart of another method for determining a default beam provided in an embodiment of the present disclosure.

An embodiment of the present disclosure provides another method for determining a default beam. FIG. 2 is a flow chart of another method for determining a default beam provided in an embodiment of the present disclosure. The method for determining the default beam may be applied to a terminal device. The method for determining the default beam may be executed alone, may be executed together with any one of the embodiments or implementations of the embodiments in the present disclosure, or may be executed together with any technical solution in related technologies.

As shown in FIG. 2, the method for determining the default beam may include steps as follows.

In step 201, one transmission configuration indication (TCI) state corresponding to a specific physical downlink control channel (PDCCH) is determined.

In step 202, the default beam is determined according to the one TCI state.

It is to be noted that the explanation of the default beam in any one of the above-mentioned embodiment is also applicable to this embodiment, which will not be elaborated herein.

In an embodiment of the present disclosure, when the specific PDCCH corresponds to the one TCI state, the default beam may be determined according to the one TCI state corresponding to the specific PDCCH, that is, a beam indicated by the one TCI state corresponding to the specific PDCCH may be taken as the default beam.

The method for determining the default beam is provided in the embodiment of the present disclosure. The one TCI state corresponding to the specific PDCCH is determined by the terminal device, and the default beam is determined according to the one TCI state corresponding to the specific PDCCH. Therefore, in case that the terminal device does not receive a beam indication signaling sent by a network side device, the terminal device may also determine the default beam, so as to communicate with the network side device based on the default beam, thus improving the communication success rate.

It is to be noted that the above implementations may be executed separately or in combination, which is not limited in the embodiment of the present disclosure.

Figure 3:
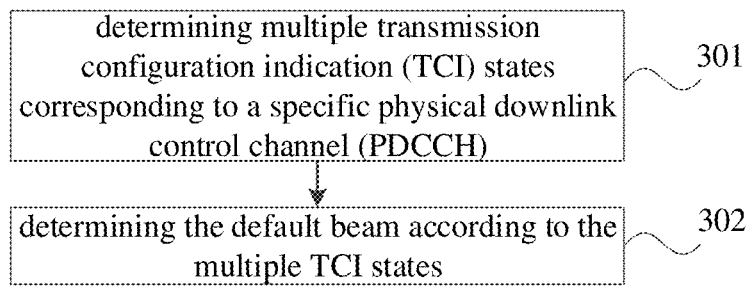
FIG. 3 is a flow chart of another method for determining a default beam provided in an embodiment of the present disclosure.

An embodiment of the present disclosure provides another method for determining a default beam. FIG. 3 is a flow chart of another method for determining a default beam provided in an embodiment of the present disclosure. The method for determining the default beam may be applied to a terminal device. The method for determining the default beam may be executed alone, may be executed together with any one of the embodiments or implementations of the embodiments in the present disclosure, or may be executed together with any technical solution in related technologies.

As shown in FIG. 3, the method for determining the default beam may include steps as follows.

In step 301, multiple transmission configuration indication (TCI) states corresponding to a specific physical downlink control channel (PDCCH) are determined.

In step 302, the default beam is determined according to the multiple TCI states.

It is to be noted that the explanation of the default beam in any one of the above-mentioned embodiment is also applicable to this embodiment, which will not be elaborated herein.

In an embodiment of the present disclosure, when the specific PDCCH corresponds to the multiple TCI states, the default beam may be determined according to the multiple TCI states.

In an implementation, one default beam may be determined according to one specific TCI state in the multiple TCI states, that is, the beam indicated by the specific TCI state may be taken as the default beam.

In another implementation, multiple default beams may be determined according to the multiple TCI states, that is, the beams indicated by the multiple TCI states may be taken as the default beam.

For example, when the specific PDCCH corresponds to two TCI states, beams indicated by the two TCI states may be taken as the default beam.

The method for determining the default beam is provided in the embodiment of the present disclosure. The multiple TCI states corresponding to the specific PDCCH are determined by the terminal device, and the default beam is determined according to the multiple TCI states corresponding to the specific PDCCH. Therefore, in case that the terminal device does not receive a beam indication signaling sent by a network side device, the terminal device may also determine the default beam, so as to communicate with the network side device based on the default beam, thus improving the communication success rate.

It is to be noted that the above implementations may be executed separately or in combination, which is not limited in the embodiment of the present disclosure.

Figure 4:
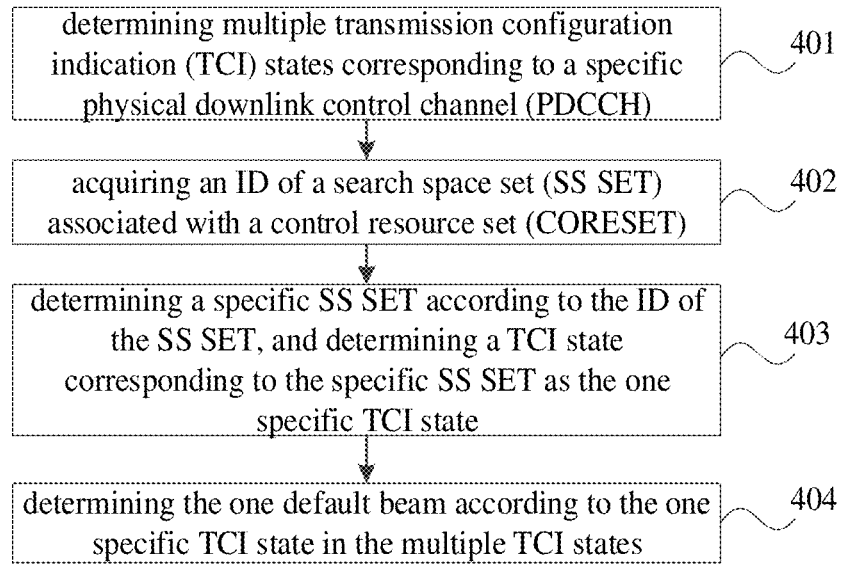
FIG. 4 is a flow chart of another method for determining a default beam provided in an embodiment of the present disclosure.

An embodiment of the present disclosure provides another method for determining a default beam. FIG. 4 is a flow chart of another method for determining a default beam provided in an embodiment of the present disclosure. The method for determining the default beam may be applied to a terminal device. The method for determining the default beam may be executed alone, may be executed together with any one of the embodiments or implementations of the embodiments in the present disclosure, or may be executed together with any technical solution in related technologies.

As shown in FIG. 4, the method for determining the default beam may include steps as follows.

In step 401, multiple transmission configuration indication (TCI) states corresponding to a specific physical downlink control channel (PDCCH) are determined.

In step 402, an identifier (ID) of a search space set (SS SET) associated with a control resource set (CORESET) are acquired.

In an embodiment of the present disclosure, the CORESET is configured to receive the specific PDCCH, that is, the specific PDCCH is received on the CORESET. That is, a time frequency resource corresponding to the PDCCH is determined by the CORESET and the SS SET associated with the CORESET.

In the embodiment of the present disclosure, the terminal device may determine the SS SET associated with the CORESET and acquire the ID of the SS SET associated with the CORESET.

In step 403, a specific SS SET is determined according to the ID of the SS SET, and a TCI state corresponding to the specific SS SET is determined as the one specific TCI state.

In an embodiment of the present disclosure, at least two SS SETs existing in the SS SET associated with the CORESET are SS SETs configured for a multi-TRP PDCCH transmission. The terminal device may determine the specific SS SET according to IDs of multiple SS SETs configured for the multi-TRP PDCCH transmission, and take the TCI state corresponding to the specific SS SET as the one specific TCI state.

In an implementation, the terminal device may determine a SS SET with a smallest ID according to the IDs of the multiple SS SETs, and take the SS SET with the smallest ID as the specific SS SET, so that the TCI state corresponding to the specific SS set may be taken as the one specific TCI state.

In step 404, the one default beam is determined according to the one specific TCI state.

In an embodiment of the present disclosure, after determining the one specific TCI state, the terminal device may determine the default beam according to the one specific TCI state in the multiple TCI states, that is, the beam indicated by the one specific TCI state may be taken as the default beam.

It is to be noted that the embodiment of the present disclosure does not limit an execution sequence of the step 401 and the steps 402 to 403. The above merely takes the steps 402 to 403 to be executed after step 401 as an example, but the present disclosure is not limited thereto. For example, the steps 402 to 403 may also be executed before the step 401, or the steps 402 to 403 may be executed in parallel with the step 401, or the step 402 may be executed before the step 401, and the step 403 is executed after the step 401.

The method for determining the default beam is provided in the embodiment of the present disclosure. The one or multiple TCI states corresponding to the specific PDCCH are determined by the terminal device, and the default beam is determined according to the one or multiple TCI states corresponding to the specific PDCCH. Therefore, in case that the terminal device does not receive a beam indication signaling sent by a network side device, the terminal device may also determine the default beam, so as to communicate with the network side device based on the default beam, thus improving the communication success rate.

It is to be noted that the above implementations may be executed separately or in combination, which is not limited in the embodiment of the present disclosure.

Figure 5:
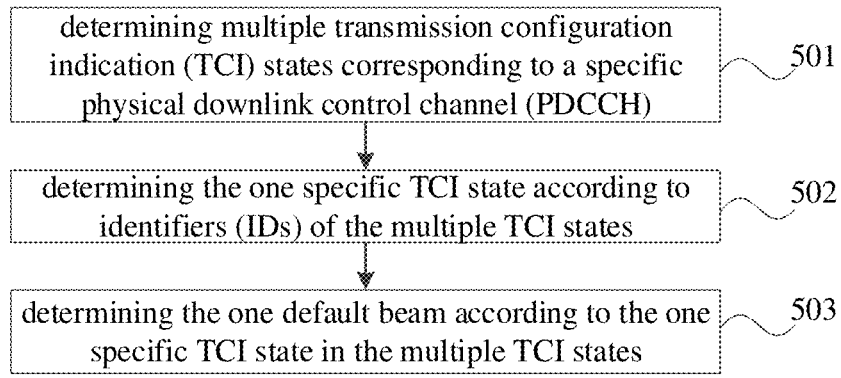
FIG. 5 is a flow chart of another method for determining a default beam provided in an embodiment of the present disclosure.

An embodiment of the present disclosure provides another method for determining a default beam. FIG. 5 is a flow chart of another method for determining a default beam provided in an embodiment of the present disclosure. The method for determining the default beam may be applied to a terminal device. The method for determining the default beam may be executed alone, may be executed together with any one of the embodiments or implementations of the embodiments in the present disclosure, or may be executed together with any technical solution in related technologies.

As shown in FIG. 5, the method for determining the default beam may include steps as follows.

In step 501, multiple transmission configuration indication (TCI) states corresponding to a specific physical downlink control channel (PDCCH) are determined.

In step 502, the one specific TCI state is determined according to identifiers (IDs) of the multiple TCI states.

In an embodiment of the present disclosure, the terminal device may determine the one specific TCI state according to the IDs of the multiple TCI states.

In an implementation, the terminal device may determine a TCI state with a smallest ID according to the IDs of the multiple TCI states, and take the TCI state with the smallest ID as the one specific TCI state.

In step 503, the one default beam is determined according to the one specific TCI state in the multiple TCI states.

In an embodiment of the present disclosure, after determining the one specific TCI state, the terminal device may determine the one default beam according to the one specific TCI state in the multiple TCI states, that is, the beam indicated by the one specific TCI state may be taken as the default beam.

The method for determining the default beam is provided in the embodiment of the present disclosure. The one or multiple TCI states corresponding to the specific PDCCH are determined by the terminal device, and the default beam is determined according to the one or multiple TCI states corresponding to the specific PDCCH. Therefore, in case that the terminal device does not receive a beam indication signaling sent by a network side device, the terminal device may also determine the default beam, so as to communicate with the network side device based on the default beam, thus improving the communication success rate.

It is to be noted that the above implementations may be executed separately or in combination, which is not limited in the embodiment of the present disclosure.

Figure 6:
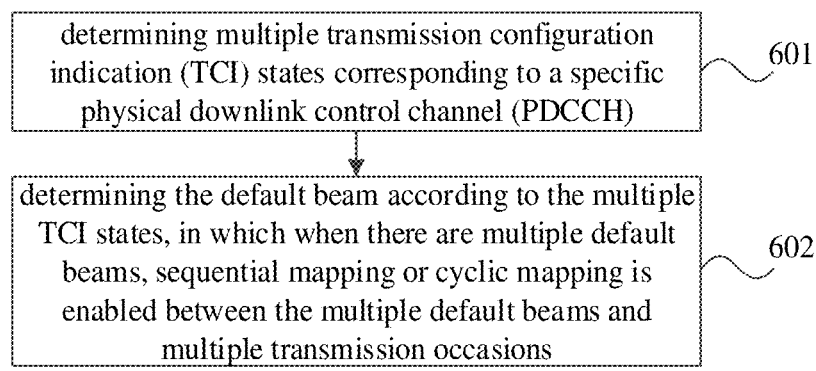
FIG. 6 is a flow chart of another method for determining a default beam provided in an embodiment of the present disclosure.

An embodiment of the present disclosure provides another method for determining a default beam. FIG. 6 is a flow chart of another method for determining a default beam provided in an embodiment of the present disclosure. The method for determining the default beam may be applied to a terminal device. The method for determining the default beam may be executed alone, may be executed together with any one of the embodiments or implementations of the embodiments in the present disclosure, or may be executed together with any technical solution in related technologies.

As shown in FIG. 6, the method for determining the default beam may include steps as follows.

In step 601, multiple transmission configuration indication (TCI) states corresponding to a specific physical downlink control channel (PDCCH) are determined.

In step 602, the default beam is determined according to the multiple TCI states, in which when there are multiple default beams, sequential mapping or cyclic mapping is enabled between the multiple default beams and multiple transmission occasions.

In an embodiment of the present disclosure, the steps 601 to 602 may be implemented in any one of various embodiments of the present disclosure, which is not limited in the embodiment of the present disclosure, and will not be elaborated herein.

In the embodiment of the present disclosure, a multiplexing manner between the multiple transmission occasions may include at least one of time division multiplexing (TDM), frequency division multiplexing (FDM), or space division multiplex (SDM). That is, resources occupied by the multiple transmission occasions are different in at least one of the following dimensions: a time domain resource, a frequency domain resource, a spatial resource (that is, an antenna port), and a beam direction.

In the embodiment of the present disclosure, a typical value of the above-mentioned multiple is two, of course, it may also be other values, which is not limited in the present disclosure. In the following, an illustrative description will be made by taking the multiple being two.

As an example, when the default beam is beams (for example, QCL Type D or a spatial setting) indicated by two TCI states (referred to as a first TCI state and a second TCI state, respectively), when the multiple transmission occasions are configured, assuming that two transmission occasions are configured, the cyclic mapping is enabled, that is, different transmission occasions correspond to different TCI states. The default beam is taken as an example of the default beam configured for the PUCCH transmission for description below. It may be understood that a mapping method between the default beam and transmission occasion may also be applied to a default beam configured for at least one other communication transmission, including the transmission of a PDCCH, a PUSCH, and a reference signal. Assuming that there are four transmission occasions, that is, the PUCCH needs to be transmitted four times, for the sequential mapping, a first transmission and a second transmission may adopt the beam indicated by the first TCI state to transmit the PUCCH, and a third transmission and a fourth transmission may adopt the beam indicated by the second TCI state to transmit the PUCCH. For the cyclic mapping, the first and the third transmissions may adopt the beam indicated by the first TCI state to transmit the PUCCH, and the second and the fourth transmissions may adopt the beam indicated by the second TCI state to transmit the PUCCH.

It is to be noted that the multiple transmission occasions may be configured for a repeated transmission or a non-repeated transmission, which is not limited in the present disclosure. This may be applied to all embodiments of the present disclosure.

It is to be noted that in a process of transmitting a PUCCH at a certain transmission occasion, the PUCCH may not be able to send because of other resource constraints, so that the PUCCH may not be sent, that is, drop is lost. A method for mapping a relationship between the default beam and the transmission occasion includes two solutions. One solution is as follows. Regardless of drop, the solution that does not consider the drop is illustrated with the cyclic mapping. Assuming that the default beam is the default beam configured for the PUCCH transmission, and the transmission occasions are four, that is, the PUCCH needs to be transmitted four times, the first and the third transmissions adopt the beam indicated by the first TCI state, and the second and the fourth transmissions adopt the beam indicated by the second TCI state. Assuming that the second transmission cannot transmit the PUCCH due to a slot format or other reasons, the second transmission still uses the beam indicated by the second TCI state without affecting the TCI state used by the third and fourth transmissions. That is, the solution without considering the drop is to determine the TCI state adopted in each transmission of PUCCH according to a preset mapping relationship between each transmission occasion and an adopted TCI state, so that the PUCCH is transmitted according to the beam indicated by the TCI state. Even if the PUCCH cannot be sent in a certain transmission, the TCI states adopted in other transmissions will not change.

The other solution is as follows. Considering the drop, the solution that considers the drop is illustrated with the cyclic mapping. Assuming that the default beam is the default beam configured for the PUCCH transmission, and the transmission occasions are four, that is, the PUCCH needs to be transmitted four times, the first and the third transmissions adopt the beam indicated by the first TCI state, and the second and the fourth transmissions adopt the beam indicated by the second TCI state. Assuming that the second transmission cannot transmit the PUCCH due to a slot format or other reasons, the second transmission is equivalent to not using the beam indicated by the second TCI state. At this time, a TCI state used for a subsequent transmission will be affected, that is, the third transmission will use the beam indicated by the second TCI state, and the fourth transmission will use the beam indicated by the first TCI state. That is, the solution considering the drop is to determine a TCI state adopted in each transmission of PUCCH according to a mapping relationship between an actual transmission occasion and an adopted TCI state, so as to transmit the PUCCH according to the beam indicated by the TCI state.

The method for determining the default beam is provided in the embodiment of the present disclosure. The one or multiple TCI states corresponding to the specific PDCCH are determined by the terminal device, and the default beam is determined according to the one or multiple TCI states corresponding to the specific PDCCH. Therefore, in case that the terminal device does not receive a beam indication signaling sent by a network side device, the terminal device may also determine the default beam, so as to communicate with the network side device based on the default beam, thus improving the communication success rate.

It is to be noted that the above implementations may be executed separately or in combination, which is not limited in the embodiment of the present disclosure.

Figure 7:
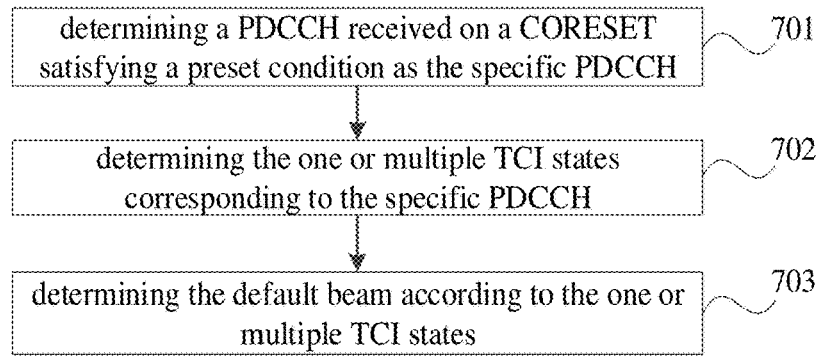
FIG. 7 is a flow chart of another method for determining a default beam provided in an embodiment of the present disclosure.

An embodiment of the present disclosure provides another method for determining a default beam. FIG. 7 is a flow chart of another method for determining a default beam provided in an embodiment of the present disclosure. The method for determining the default beam may be applied to a terminal device. The method for determining the default beam may be executed alone, may be executed together with any one of the embodiments or implementations of the embodiments in the present disclosure, or may be executed together with any technical solution in related technologies.

As shown in FIG. 7, the method for determining the default beam may include steps as follows.

In step 701, a PDCCH received on a CORESET satisfying a preset condition is determined as the specific PDCCH.

In an embodiment of the present disclosure, the preset condition is preset. For example, the preset condition may be specified in a protocol, preset by a terminal device, or configured by a network side device.

In the embodiment of the present disclosure, the terminal device may take the PDCCH received on the CORESET satisfying the preset condition as the specific PDCCH.

As an example, taking the preset condition is the CORESET ID being the smallest for example, and the PDCCH received on a CORESET with a smallest CORESET ID may be taken as the specific PDCCH.

In step 702, the one or multiple TCI states corresponding to the specific PDCCH is determined.

In an implementation, one or multiple TCI states corresponding to the CORESET satisfying the preset condition may be taken as the one or multiple TCI states corresponding to the specific PDCCH.

That is, a CORESET satisfying the preset condition may be configured with one TCI state, or may be configured with multiple TCI states, for example two TCI states.

In step 703, the default beam is determined according to the one or multiple TCI states.

In an embodiment of the present disclosure, the step 703 may be implemented in any one of various embodiments of the present disclosure, which is not limited in the embodiment of the present disclosure, and will not be elaborated herein.

The method for determining the default beam is provided in the embodiment of the present disclosure. The one or multiple TCI states corresponding to the specific PDCCH are determined by the terminal device, and the default beam is determined according to the one or multiple TCI states corresponding to the specific PDCCH. Therefore, in case that the terminal device does not receive a beam indication signaling sent by a network side device, the terminal device may also determine the default beam, so as to communicate with the network side device based on the default beam, thus improving the communication success rate.

It is to be noted that the above implementations may be executed separately or in combination, which is not limited in the embodiment of the present disclosure.

Figure 8:
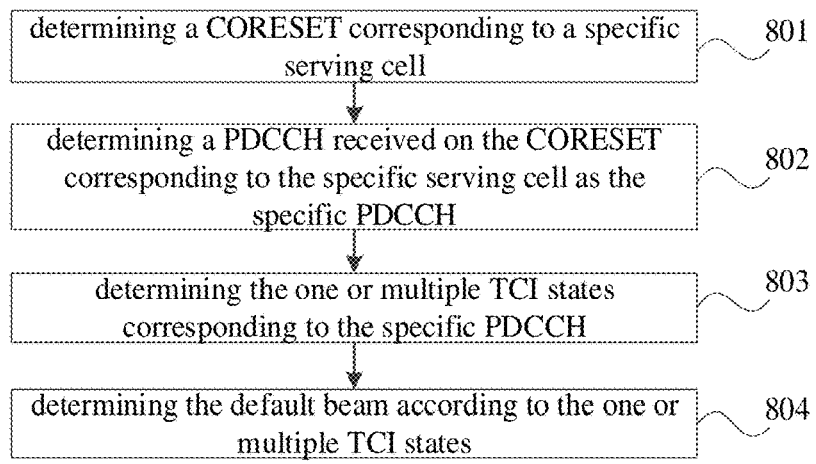
FIG. 8 is a flow chart of another method for determining a default beam provided in an embodiment of the present disclosure.

An embodiment of the present disclosure provides another method for determining a default beam. FIG. 8 is a flow chart of another method for determining a default beam provided in an embodiment of the present disclosure. The method for determining the default beam may be applied to a terminal device. The method for determining the default beam may be executed alone, may be executed together with any one of the embodiments or implementations of the embodiments in the present disclosure, or may be executed together with any technical solution in related technologies.

As shown in FIG. 8, the method for determining the default beam may include steps as follows.

In step 801, a CORESET corresponding to a specific serving cell is determined.

In an embodiment of the present disclosure, the specific serving cell may include a primary cell (PCell), a primary secondary cell (PSCell), or a secondary cell (SCell).

In the embodiment of the present disclosure, the terminal device may determine the specific serving cell and determine the CORESET corresponding to the specific serving cell.

In step 802, a PDCCH received on the CORESET corresponding to the specific serving cell is determined as the specific PDCCH.

In an embodiment of the present disclosure, the terminal device may take the PDCCH received on the CORESET corresponding to the specific serving cell as the specific PDCCH.

In step 803, the one or multiple TCI states corresponding to the specific PDCCH is determined.

In an implementation, the terminal device may take one or multiple TCI states corresponding to the CORESET corresponding to the specific serving cell as the one or multiple TCI states corresponding to the specific PDCCH.

As an example, when the specific serving cell corresponds to one CORESET, the terminal device may take one or multiple TCI states corresponding to the one CORESET corresponding to the specific serving cell as the one or multiple TCI states corresponding to the specific PDCCH.

As another example, when the specific serving cell corresponds to multiple CORESETs, the terminal device may take one or multiple TCI states corresponding to a specific CORESET in the multiple CORESET corresponding to the specific serving cell as the one or multiple TCI states corresponding to the specific PDCCH. The specific CORESET may be the CORESET with the smallest CORESET ID, the specific CORESET may be a CORESET with a largest CORESET ID, or the specific CORESET may be a CORESET with neither a largest CORESET ID nor a smallest CORESET ID.

In step 804, the default beam is determined according to the one or multiple TCI states.

As an example, when the specific serving cell corresponds to one CORESET, in case that the CORESET is configured with one TCI state, the default beam may be a beam indicated by the TCI state corresponding to the CORESET.

As another example, when the specific serving cell corresponds to one CORESET, in case that the CORESET is configured with multiple TCI states and not configured with multiple transmission occasions, one TCI state in the multiple TCI states may be taken as the one specific TCI state, so that a beam indicated by the one specific TCI state may be taken as the default beam.

As an example, a TCI state with a smallest ID in the multiple TCI states may be taken as the one specific TCI state.

As another example, multiple SS SETs associated with the CORESET may be determined, and a SS SET with a smallest ID in the multiple SS SETs may be taken as a specific SS SET, so that a TCI state corresponding to the specific SS SET may be taken as the one specific TCI state.

As another example, when the specific serving cell corresponds to one CORESET, in case that the CORESET is configured with the multiple TCI states and configured with the multiple transmission occasions, one TCI state in the multiple TCI states may be taken as the one specific TCI state, so that a beam indicated by the one specific TCI state may be taken as the default beam. Alternatively, beams indicated by the multiple TCI states may also be taken as multiple default beams, in which sequential mapping or cyclic mapping is enabled between the multiple default beams and the multiple transmission occasions. For details, reference may be made to the execution process of FIG. 6, which will not be elaborated herein.

As another example, when the specific serving cell corresponds to multiple CORESETs, the CORESET satisfying the preset condition may be determined. For example, a CORESET with a smallest ID in the multiple CORESETs is determined, and the default beam is determined according to the one or multiple TCI states corresponding to the CORESET satisfying the preset condition. For the specific determination process, reference may be made to the above-mentioned first three examples, which will not be elaborated herein.

In an implementation, in order to avoid having multiple beams, in the present disclosure, determining the CORESET satisfying the preset condition may include determining a CORESET with a smallest CORESET ID in CORESETs configured with merely one TCI state, so that the terminal device may take a beam indicated by a TCI state corresponding to the CORESET with the smallest CORESET ID as the default beam.

In an implementation, in order to implement multiple default beams, in the present disclosure, determining the CORESET satisfying the preset condition may include determining a CORESET with a smallest CORESET ID in CORESETs configured with multiple TCI states, so that the terminal device may take a beam indicated by a TCI state corresponding to the CORESET with the smallest CORESET ID as the default beam. A typical value here may be two.

The method for determining the default beam is provided in the embodiment of the present disclosure. The one or multiple TCI states corresponding to the specific PDCCH are determined by the terminal device, and the default beam is determined according to the one or multiple TCI states corresponding to the specific PDCCH. Therefore, in case that the terminal device does not receive a beam indication signaling sent by a network side device, the terminal device may also determine the default beam, so as to communicate with the network side device based on the default beam, thus improving the communication success rate.

It is to be noted that the above implementations may be executed separately or in combination, which is not limited in the embodiment of the present disclosure.

Figure 9:
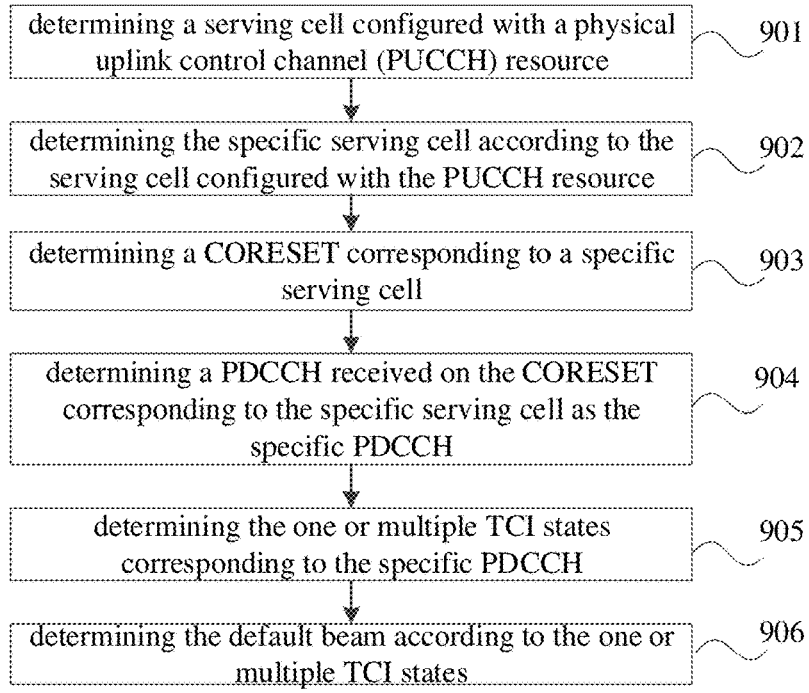
FIG. 9 is a flow chart of another method for determining a default beam provided in an embodiment of the present disclosure.

An embodiment of the present disclosure provides another method for determining a default beam. FIG. 9 is a flow chart of another method for determining a default beam provided in an embodiment of the present disclosure. The method for determining the default beam may be applied to a terminal device. The method for determining the default beam may be executed alone, may be executed together with any one of the embodiments or implementations of the embodiments in the present disclosure, or may be executed together with any technical solution in related technologies.

As shown in FIG. 9, the method for determining the default beam may include steps as follows.

In step 901, a serving cell configured with a physical uplink control channel (PUCCH) resource is determined.

In step 902, the specific serving cell is determined according to the serving cell configured with the PUCCH resource.

In an embodiment of the present disclosure, a terminal device may determine the serving cell configured with the PUCCH resource, and determine the specific serving cell according to the serving cell configured with the PUCCH resource. That is, the terminal device may take the serving cell configured with the PUCCH resource as the specific serving cell. Additionally, when the serving cell configured with the PUCCH resource is a PCell, the PCell may be taken as the specific serving cell. When the serving cell configured with the PUCCH resource is a PSCell, the PSCell may be taken as the specific serving cell. When the serving cell configured with the PUCCH resource is a SCell, the SCell may be taken as the specific serving cell.

As an example, when the PUCCH resource is configured on a PCell, the specific serving cell is the Pcell. Alternatively, when the PUCCH resource is configured on a PSCell, the specific serving cell is the PSCell. Alternatively, when the PUCCH resource is configured on a SCell, the specific serving cell is the SCell. Of course, the above is merely an illustrative description, and this is not limited in the present disclosure. For example, the specific serving cell may also be any serving cell configured with the PUCCH resource.

In step 903, a CORESET corresponding to a specific serving cell is determined.

In an embodiment of the present disclosure, the terminal device may determine the CORESET corresponding to the specific serving cell.

In step 904, a PDCCH received on the CORESET corresponding to the specific serving cell is determined as the specific PDCCH.

In an embodiment of the present disclosure, the terminal device may take the PDCCH received on the CORESET corresponding to the specific serving cell as the specific PDCCH.

In step 905, the one or multiple TCI states corresponding to the specific PDCCH is determined.

In an implementation, the terminal device may take one or multiple TCI states corresponding to the CORESET corresponding to the specific serving cell as the one or multiple TCI states corresponding to the specific PDCCH.

In step 906, the default beam is determined according to the one or multiple TCI states.

In an embodiment of the present disclosure, the step 906 may be implemented in any one of various embodiments of the present disclosure, which is not limited in the embodiment of the present disclosure, and will not be elaborated herein.

That is, in the present disclosure, the specific serving cell may be determined, and the default beam is determined according to the one or multiple TCI states corresponding to the CORESET corresponding to the specific serving cell. A typical value of the above-mentioned multiple is two, of course, it may also be other values, which is not limited in the present disclosure. In the following, the multiple being two and the default beam being the default beam configured for PUCCH transmission are taken as an example for illustrative description. It may be understood that the default beam determination method is also applicable to the default beam configured for at least one other communication transmissions, including the transmission of a PDCCH, a PDSCH, a PUSCH and a reference signal.

In a first case, when the specific serving cell corresponds to one CORESET, in case that the CORESET is configured with one TCI state, the default beam may be a beam indicated by the TCI state corresponding to the CORESET.

In a second case, when the specific serving cell corresponds to one CORESET, in case that the CORESET is configured with two TCI states, and the PUCCH transmission merely needs to be transmitted once, one TCI state in the two TCI states may be taken as one specific TCI state, so that a beam indicated by the one specific TCI state may be taken as the default beam.

As an example, a TCI state with a smaller ID in the two TCI states may be taken as the one specific TCI state.

As another example, multiple SS SETs associated with the CORESET may be determined, and a SS SET with a smallest ID in the multiple SS SETs may be taken as a specific SS SET, so that a TCI state corresponding to the specific SS SET may be taken as the one specific TCI state.

In a third case, when the specific serving cell corresponds to one CORESET, in case that the CORESET is configured with two TCI states and there are multiple transmission occasions, that is, the PUCCH transmission needs to be transmitted multiple times, and the multiple transmissions may be a repeated transmission or a non-repeated transmission, one TCI state in the TCI states may be taken as the one specific TCI state, so that a beam indicated by the one specific TCI state may be taken as the default beam. Alternatively, beams indicated by the two TCI states may be taken as two default beams, and sequential mapping or cyclic mapping may be enabled between the two default beams and the multiple transmission occasions. For details, reference may be made to the execution process of FIG. 6, which will not be elaborated herein.

In a fourth case, when the specific serving cell corresponds to two CORESETs, a CORESET satisfying a preset condition may be determined. For example, a CORESET with a smaller CORESET ID is determined, and the default beam may be determined according to one or multiple TCI states corresponding to the CORESET satisfying the preset condition. For the specific determination process, reference may be made to the above-mentioned first to third modes, which will not be elaborated herein.

In an implementation, in order to avoid having multiple beams, in the present disclosure, determining the CORESET satisfying the preset condition may include determining a CORESET with a smallest CORESET ID in CORESETs configured with merely one TCI state, so that the terminal device may take a beam indicated by a TCI state corresponding to the CORESET with the smallest CORESET ID as the default beam.

In an implementation, in order to implement multiple default beams, in the present disclosure, determining the CORESET satisfying the preset condition may include determining a CORESET with a smallest CORESET ID in CORESETs configured with multiple TCI states, so that the terminal device may take a beam indicated by a TCI state corresponding to the CORESET with the smallest CORESET ID as the default beam. A typical value here may be two.

Therefore, by determining the default beam, a same beam may be used for PUCCH transmission between a network side device and the terminal device, and the success rate of PUCCH transmission is improved.

The method for determining the default beam is provided in the embodiment of the present disclosure. The one or multiple TCI states corresponding to the specific PDCCH are determined by the terminal device, and the default beam is determined according to the one or multiple TCI states corresponding to the specific PDCCH. Therefore, in case that the terminal device does not receive a beam indication signaling sent by the network side device, the terminal device may also determine the default beam, so as to communicate with the network side device based on the default beam, thus improving the communication success rate.

It is to be noted that the above implementations may be executed separately or in combination, which is not limited in the embodiment of the present disclosure.

Figure 10:
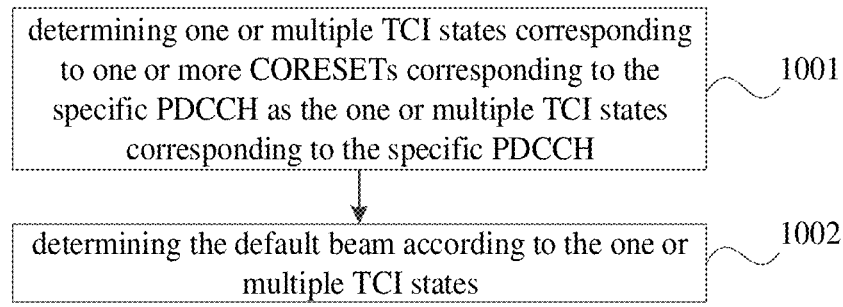
FIG. 10 is a flow chart of another method for determining a default beam provided in an embodiment of the present disclosure.

An embodiment of the present disclosure provides another method for determining a default beam. FIG. 10 is a flow chart of another method for determining a default beam provided in an embodiment of the present disclosure. The method for determining the default beam may be applied to a terminal device. The method for determining the default beam may be executed alone, may be executed together with any one of the embodiments or implementations of the embodiments in the present disclosure, or may be executed together with any technical solution in related technologies.

As shown in FIG. 10, the method for determining the default beam may include steps as follows.

In step 1001, one or multiple TCI states corresponding to one or more CORESETs corresponding to the specific PDCCH is determined as the one or multiple TCI states corresponding to the specific PDCCH.

It is to be noted that the explanation of the specific PDCCH in any one of the above-mentioned embodiment is also applicable to this embodiment, which will not be elaborated herein.

In an embodiment of the present disclosure, the specific PDCCH may be a PDCCH configured to schedule a specific communication transmission, and the default beam may be configured for the specific communication transmission and/or to carry a PUCCH resource of hybrid automatic repeat request acknowledgement (HARQ ACK) feedback information. The HARQ ACK feedback information may be directed for the specific communication transmission, or may also be directed for other communication transmissions, which is not limited in the present disclosure.

In an implementation, the specific communication transmission includes at least one of a communication transmission carried on a physical downlink shared channel (PDSCH), semi-persistent scheduling (SPS) release, an aperiodic channel state information reference signal (CSI-RS), a communication transmission carried on a physical uplink shared channel (PUSCH), or a communication transmission carried on a PUCCH.

It is to be noted that when the specific communication transmission is the communication transmission carried on the PDSCH and/or the SPS release, the default beam may be a PUCCH configured to carry a HARQ ACK feedback. The HARQ ACK is a HARQ ACK feedback for the communication transmission carried on the PDSCH scheduled and/or the SPS release for the specific PDCCH, or the HARQ ACK feedback is a HARQ ACK feedback for beam indication information sent by the specific PDCCH. That is, the specific PDCCH may schedule at least one of the communication transmission carried on the PDSCH and the beam indication information. The beam indication information may be configured to indicate a beam corresponding to at least one communication transmission. The PUCCH resource configured to carry the HARQ ACK feedback may determine a location of the above-mentioned PUCCH resource according to a CORESET parameter corresponding to the specific PDCCH.

In the embodiment of the present disclosure, one or more CORESETs corresponding to the specific PDCCH may be determined, and one or multiple TCI states corresponding to one or more CORESETs corresponding to the specific PDCCH is determined as the one or multiple TCI states corresponding to the specific PDCCH.

In step 1002, the default beam is determined according to the one or multiple TCI states.

In a first implementation, in case that the specific PDCCH corresponds to one CORESET, and the one CORESET is configured with one TCI state, the default beam may be a beam indicated by the TCI state corresponding to the CORESET.

In a second implementation, in case that the specific PDCCH corresponds to one CORESET, and the one CORESET is configured with multiple TCI states and not configured with multiple transmission occasions for communication transmission, one TCI state in the multiple TCI states may be taken as the one specific TCI state, so that a beam indicated by the one specific TCI state may be taken as the default beam.

As an example, a TCI state with a smallest ID in the multiple TCI states may be taken as the one specific TCI state.

As another example, multiple SS SETs associated with the CORESET may be determined, and a SS SET with a smallest ID in the multiple SS SETs may be taken as a specific SS SET, so that a TCI state corresponding to the specific SS SET may be taken as the one specific TCI state.

In a third implementation, in case that the specific PDCCH corresponds to one CORESET, and the one CORESET is configured with multiple TCI states and configured with multiple transmission occasions for communication transmission, one TCI state in the multiple TCI states may be taken as the one specific TCI state (for example, a TCI state with a smallest ID in the multiple TCI states may be taken as the one specific TCI state), so that a beam indicated by the specific TCI state may be taken as the default beam. Alternatively, beams indicated by multiple TCI states may be taken as multiple default beams, in which sequential mapping or cyclic mapping is enabled between the multiple default beams and the multiple transmission occasions. For details, reference may be made to the execution process of FIG. 6, which will not be elaborated herein.

In a fourth implementation, in case that the specific PDCCH corresponds to multiple CORESETs, and each CORESET is configured with one TCI state, a TCI state corresponding to one CORESET in the multiple CORESETs may be taken as the one specific TCI state, so that a beam indicated by the one specific TCI state may be taken as the default beam.

As an example, the one specific TCI state may be a TCI state corresponding to a CORESET with a smallest CORESET ID.

As another example, the one specific TCI state may be a TCI state corresponding to a CORESET associated with a SS SET with a smallest SS SET ID (referred to as a specific SS SET in the present disclosure).

In a fifth implementation, the specific PDCCH corresponds to multiple CORESETs, and each CORESET is configured with one TCI state. In case that multiple transmission occasions for communication transmission are configured, a TCI state corresponding to one CORESET in the multiple CORESETs may be taken as the one specific TCI state, so that a beam indicated by the one specific TCI state may be taken as the default beam. A specific manner is the same as the above fourth implementation. Alternatively, beams indicated by TCI states corresponding to the multiple CORESET may be taken as multiple default beams, in which sequential mapping or cyclic mapping is enabled between the multiple default beams and the multiple transmission occasions. For details, reference may be made to the execution process of FIG. 6, which will not be elaborated herein.

That is, in the present disclosure, the specific PDCCH may correspond to one or more CORESETs (typically two CORESETs). In the following, the multiple being two and the communication transmission being PUCCH transmission are taken as an example for illustrative description. It may be understood that the following method is also applicable to the default beam configured for at least one other communication transmissions, including the transmission of a PDCCH, a PDSCH, a PUSCH and a reference signal. When the specific PDCCH corresponds to one CORESET, the one CORESET may be configured with one or two TCI states, or when the specific PDCCH corresponds to two CORESET, each CORESET may be configured with one TCI state, that is, the following situations exist in the present disclosure.

Firstly, in case that the specific PDCCH is sent by one CORESET, and the one CORESET is configured with one TCI state, the default beam may be a beam indicated by a TCI state corresponding to the one CORESET.

Secondly, the specific PDCCH is sent by one CORESET, and the one CORESET is configured with two TCI states. In case that a PUCCH transmission merely needs to be transmitted once, one TCI state in the two TCI states may be taken as the one specific TCI state, so that a beam indicated by the one specific TCI state may be taken as the default beam.

Thirdly, when the specific PDCCH corresponds to one CORESET, in case that the CORESET is configured with multiple TCI states and there are multiple transmission occasions, that is, a PUCCH transmission needs to be transmitted multiple times, one TCI state in the multiple TCI states may be taken as the one specific TCI state, so that a beam indicated by the one specific TCI state may be taken as the default beam. Alternatively, beams indicated by the multiple TCI states may be taken as multiple default beams.

Fourthly, when the specific PDCCH is sent by two CORESETs, and each CORESET is configured with one TCI state, a TCI state corresponding to one CORESET in the two CORESETs may be taken as the one specific TCI state, so that a beam indicated by the one specific TCI state may be taken as the default beam.

Fifthly, when the specific PDCCH is sent by two CORESETs, and each CORESET is configured with one TCI state. In case that multiple transmission occasions for communication transmission are configured, that is, a PUCCH transmission requires multiple transmission occasions, a TCI state corresponding to one CORESET in the two CORESETs may be taken as the one specific TCI state, so that a beam indicated by the one specific TCI state may be taken as the default beam. Alternatively, beams indicated by TCI states corresponding to multiple CORESET may be taken as multiple default beams.

The method for determining the default beam is provided in the embodiment of the present disclosure. The one or multiple TCI states corresponding to the specific PDCCH are determined by the terminal device, and the default beam is determined according to the one or multiple TCI states corresponding to the specific PDCCH. Therefore, in case that the terminal device does not receive a beam indication signaling sent by the network side device, the terminal device may also determine the default beam, so as to communicate with the network side device based on the default beam, thus improving the communication success rate.

It is to be noted that the above implementations may be executed separately or in combination, which is not limited in the embodiment of the present disclosure.

Figure 11:
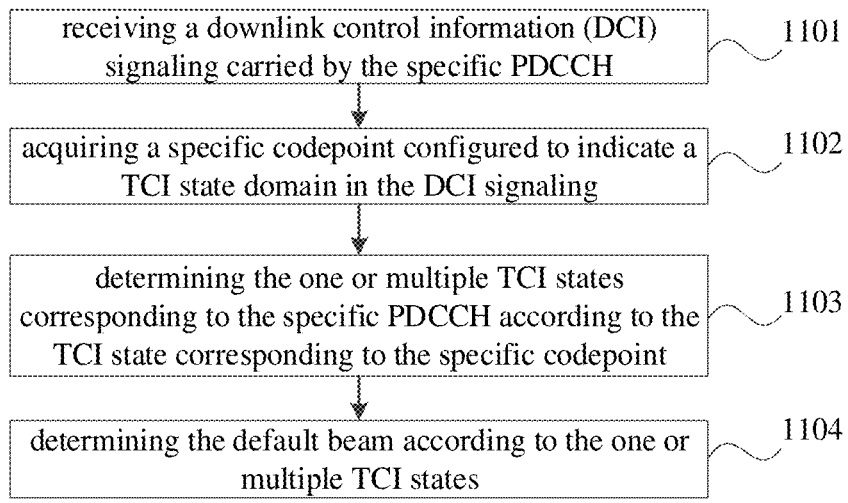
FIG. 11 is a flow chart of another method for determining a default beam provided in an embodiment of the present disclosure.

An embodiment of the present disclosure provides another method for determining a default beam. FIG. 11 is a flow chart of another method for determining a default beam provided in an embodiment of the present disclosure. The method for determining the default beam may be applied to a terminal device. The method for determining the default beam may be executed alone, may be executed together with any one of the embodiments or implementations of the embodiments in the present disclosure, or may be executed together with any technical solution in related technologies.

As shown in FIG. 11, the method for determining the default beam may include steps as follows.

In step 1101, a downlink control information (DCI) signaling carried by the specific PDCCH is received.

It is to be noted that the explanation of the specific PDCCH in any one of the above-mentioned embodiment is also applicable to this embodiment, which will not be elaborated herein.

In an embodiment of the present disclosure, the terminal device may receive the DCI signaling carried by the specific PDCCH.

In step 1102, a specific codepoint configured to indicate a TCI state domain in the DCI signaling is acquired.

In an embodiment of the present disclosure, the terminal device may acquire the specific codepoint configured to indicate the TCI state domain in the DCI signaling.

In an implementation, in case that there is no TCI state domain in the DCI signaling, a specific codepoint of a TCI state domain in a DCI format corresponding to the DCI signaling may be acquired.

In an implementation, the specific codepoint may be a smallest codepoint in multiple codepoints.

In another implementation, the specific codepoint may be a smallest codepoint in multiple codepoints of one TCI state corresponding to the TCI state domain.

In yet another implementation, the specific codepoint may be a smallest codepoint in multiple codepoints of two TCI states corresponding to the TCI state domain.

In yet another implementation, the specific codepoint may be a current codepoint of the TCI state domain.

In the embodiment of the present disclosure, the TCI state domain may be configured to indicate a beam of at least one communication transmission, that is, the TCI state domain is configured to indicate a TCI state corresponding to at least one of the following communication transmissions: a communication transmission carried on a PDCCH (that is, a TCI state of the CORESET); a communication transmission carried on a PDSCH; a communication transmission carried on a PUSCH; a communication transmission carried on a PUCCH; an aperiodic channel state information reference signal (AP CSI-RS); and an aperiodic sounding reference signal (AP SRS).

In step 1103, the one or multiple TCI states corresponding to the specific PDCCH is determined according to the TCI state corresponding to the specific codepoint.

In an implementation, the TCI state corresponding to the specific codepoint may be indicated by an MAC CE signaling.

In an embodiment of the present disclosure, the one or multiple TCI states corresponding to the specific PDCCH may be determined according to the TCI states corresponding to the specific codepoint.

In step 1104, the default beam is determined according to the one or multiple TCI states.

In an embodiment of the present disclosure, the step 1104 may be implemented in any one of various embodiments of the present disclosure, which is not limited in the embodiment of the present disclosure, and will not be elaborated herein.

That is, in the present disclosure, a common beam may be determined by the DCI signaling carried by the specific PDCCH, which may specifically include the following cases.

In a first case, a TCI state corresponding to the specific codepoint configured to indicate the TCI state domain in the DCI signaling is determined, and the default beam is determined according to the TCI state corresponding to the specific codepoint. The TCI state corresponding to the specific codepoint may be indicated by a MAC CE signaling.

As a first example, when the specific codepoint is a smallest codepoint in all codepoints, in case that the specific codepoint corresponds to multiple TCI states (a typical value of the multiple being 2), one TCI state in the multiple TCI states may be taken as the one specific TCI state, so that a beam indicated by the one specific TCI state may be taken as the default beam.

Example 1: The one specific TCI state may be determined according to IDs of multiple TCI states corresponding to the specific codepoint. For example, a TCI state with a smallest ID in the multiple TCI states may be taken as the one specific TCI state (including one transmission or multiple transmissions).

Example 2: The one specific TCI state may be determined according to a specific bit field in a MAC CE signaling configured to indicate the TCI state corresponding to the specific codepoint. For example, each codepoint may correspond to at most two TCI states, that is, two TCI state domains (referred to as a first TCI state domain and a second TCI state domain, respectively). The first TCI state domain is bound to appear, and the second TCI state domain may further indicate whether the second TCI state domain appears through an indication message. In case that the second TCI state domain does not appear, the codepoint corresponds to merely one TCI state. Otherwise, in case that the second TCI state domain appears, the codepoint corresponds to two TCI states. Therefore, in the present disclosure, the specific bit field may be the first TCI state domain that is bound to appear, and the TCI state corresponding to the specific bit field may be taken as the one specific TCI state.

As a second example, when the specific codepoint is a smallest codepoint in all codepoints, in case that the specific codepoint corresponds to multiple TCI states (a typical value of the multiple being 2), when multiple transmission occasions for communication transmission are not configured, that is, when one communication transmission is transmitted, a beam indicated by the one specific TCI state is taken as default beams (a specific manner may be the same as the above-mentioned first example). When multiple transmission occasions for communication transmission are configured, that is, when multiple communication transmissions are transmitted, beams indicated by multiple TCI states may be taken as multiple default beams, in which sequential mapping or cyclic mapping is enabled between the multiple default beams and the multiple transmission occasions.

As a third example, when the specific codepoint corresponds to a smallest codepoint in the multiple codepoints of two TCI states, the process of determining the default beam is the same as the first example and/or the second example.

As a fourth example, when the specific codepoint corresponds to a smallest codepoint in the multiple codepoints of one TCI state, the beam indicated by the one TCI state corresponding to the specific codepoint may be taken as the default beam.

In a second case, a TCI state corresponding to a current codepoint configured to indicate the TCI state domain in the DCI signaling is determined, and the default beam is determined according to the TCI state corresponding to the current codepoint.

As an example, assuming that the specific PDCCH is configured for scheduling a PDSCH, the TCI state corresponding to the current codepoint configured to indicate the TCI state domain is configured for PDSCH transmission. At this time, the default beam may be a beam indicated by the TCI state configured for PDSCH transmission.

As another example, when the current codepoint is configured to indicate one or two TCI states, the process of determining the default beam is the same as the first case.

In a third case, the DCI carried by the specific PDCCH is configured to carry a common beam, in which the common beam is a beam configured to indicate at least one communication transmission.

The common beam may include an uplink and downlink common beam, an uplink common beam, or a downlink common beam. The uplink and downlink common beam means that the common beam is configured for uplink and downlink transmission. The uplink common beam means that the common beam is configured for uplink transmission and not for downlink transmission. The downlink common beam means that the common beam is configured for downlink transmission and not for uplink transmission. The common beam may be configured for at least one uplink transmission and/or downlink transmission. The uplink transmission includes at least one of a PUCCH, a PUSCH, and a SRS. The downlink transmission includes at least one of a PDCCH, a PDSCH, and a CSI-RS.

As an example, the common beam is configured for uplink and downlink transmission, not only configured for PDSCH and/or SPS release scheduled by DCI signaling of the PDCCH, but also configured for transmission of PUCCH carrying a HARQ ACK feedback for the PDSCH and/or the SPS release.

In an present disclosure, the default beam may be determined according to a codepoint of the common beam, in which the codepoint of the common beam may correspond to one or two TCI states, and the process of determining the default beam according to the one or two TCI states corresponding to the codepoint of the common beam may be the same as the first case.

The method for determining the default beam is provided in the embodiment of the present disclosure. The one or multiple TCI states corresponding to the specific PDCCH are determined by the terminal device, and the default beam is determined according to the one or multiple TCI states corresponding to the specific PDCCH. Therefore, in case that the terminal device does not receive a beam indication signaling sent by the network side device, the terminal device may also determine the default beam, so as to communicate with the network side device based on the default beam, thus improving the communication success rate.

It is to be noted that the above implementations may be executed separately or in combination, which is not limited in the embodiment of the present disclosure.

The present disclosure further provides an apparatus for determining a default beam corresponding to the method for determining the default beam provided in the above-mentioned embodiments in FIGS. 1 to 11. Since the apparatus for determining the default beam provided in the embodiment in the present disclosure corresponds to the method for determining the default beam provided in the embodiments in FIGS. 1 to 11, the implementation of the method for determining the default beam is also applicable to the apparatus for determining the default beam provided in the embodiment in the present disclosure, which will not be described in detail in the embodiment in the present disclosure.

Figure 12:
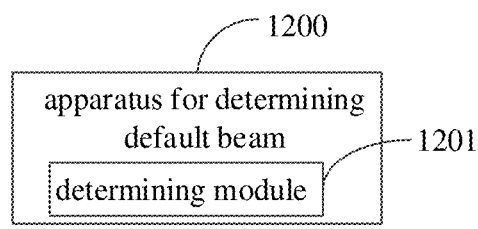
FIG. 12 is a schematic diagram of an apparatus for determining a default beam provided in an embodiment of the present disclosure.

FIG. 12 is a schematic diagram of an apparatus for determining a default beam provided in an embodiment of the present disclosure. The apparatus may be applied to a terminal device.

As shown in FIG. 12, the apparatus for determining the default beam 1200 may include a determining module 1201.

The determining module 1201 is configured to determine one or multiple transmission configuration indication (TCI) states corresponding to a specific physical downlink control channel (PDCCH), and determine the default beam according to the one or multiple TCI states.

Additionally, the determining module 1201 is specifically configured to determining the default beam according to one TCI state corresponding to the PDCCH.

Additionally, the determining module 1201 is specifically configured to determine one default beam according to one specific TCI state in the multiple TCI states, or determine multiple default beams according to the multiple TCI states.

Additionally, the determining module 1201 is specifically configured to determine the one specific TCI state according to identifiers (IDs) of the multiple TCI states, and determine the one default beam according to the one specific TCI state.

Additionally, the determining module 1201 is specifically configured to acquire an ID of a search space set (SS SET) associated with a control resource set (CORESET), determine a specific SS SET according to the ID of the SS SET, and determining a TCI state corresponding to the specific SS SET as the one specific TCI state, and determine the one default beam according to the one specific TCI state, in which the specific PDCCH is received on the CORESET.

Additionally, sequential mapping or cyclic mapping is enabled between the multiple default beams and multiple transmission occasions.

Additionally, the determining module 1201 is further configured to determine a PDCCH received on a CORESET satisfying a preset condition as the specific PDCCH.

Additionally, the determining module 1201 is specifically configured to determine one or multiple TCI states corresponding to the CORESET satisfying the preset condition as the one or multiple TCI states corresponding to the specific PDCCH.

Additionally, the determining module 1201 is further configured to determine a CORESET corresponding to a specific serving cell, and determine a PDCCH received on the CORESET corresponding to the specific serving cell as the specific PDCCH.

Additionally, the determining module 1201 is specifically configured to determine one or multiple TCI states corresponding to the CORESET corresponding to the specific serving cell as the one or multiple TCI states corresponding to the specific PDCCH.

Additionally, the determining module 1201 is further configured to determine a serving cell configured with a physical uplink control channel (PUCCH) resource, and the specific serving cell according to the serving cell configured with the PUCCH resource.

Additionally, the specific serving cell includes a primary cell, a primary secondary cell, or a secondary cell.

Additionally, the determining module 1201 is specifically configured to determine one or multiple TCI states corresponding to one or more CORESETs corresponding to the specific PDCCH as the one or multiple TCI states corresponding to the specific PDCCH.

Additionally, the specific PDCCH is configured to schedule a specific communication transmission, and the default beam is configured for the specific communication transmission and/or to carry a PUCCH resource of hybrid automatic repeat request acknowledgement (HARQ ACK) feedback information.

Additionally, the specific communication transmission includes at least one of a communication transmission carried on a physical downlink shared channel (PDSCH), semi-persistent scheduling (SPS) release, an aperiodic channel state information reference signal (CSI-RS), a communication transmission carried on a physical uplink shared channel (PUSCH), or a communication transmission carried on a PUCCH.

Additionally, the determining module 1201 is specifically configured to receive a downlink control information (DCI) signaling carried by the specific PDCCH, acquire a specific codepoint configured to indicate a TCI state domain in the DCI signaling, and determine the one or multiple TCI states corresponding to the specific PDCCH according to the TCI state corresponding to the specific codepoint.

Additionally, the specific codepoint is one of a smallest codepoint in multiple codepoints, a smallest codepoint in multiple codepoints of one TCI state corresponding to the TCI state domain, a smallest codepoint in multiple codepoints of two TCI states corresponding to the TCI state domain, or a current codepoint of the TCI state domain.

Additionally, the TCI state domain is configured to indicate a beam of at least one communication transmission.

The apparatus for determining the default beam is provided in the embodiment of the present disclosure. The one or multiple TCI states corresponding to the specific PDCCH are determined by the terminal device, and the default beam is determined according to the one or multiple TCI states corresponding to the specific PDCCH. Therefore, in case that the terminal device does not receive a beam indication signaling sent by a network side device, the terminal device may also determine the default beam, so as to communicate with the network side device based on the default beam, thus improving the communication success rate.

In order to implement the above-mentioned embodiments, the present disclosure also provides a communication device.

The communication device provided in the embodiment of the present disclosure includes a processor, a transceiver, a memory and an executable program stored in the memory and capable of being run by the processor, in which the processor is configured to execute the above-mentioned method when running the executable program.

The communication device may be the above-mentioned terminal device.

The processor may include various types of storage medium, which are non-temporary computer storage medium that may continue to memorize information stored thereon after the communication device is powered down. Here, the communication device includes a terminal device.

The processor may be connected to the memory through a bus or the like, for reading the executable program stored on the memory, for example, as shown in at least one of FIGS. 1 to 11.

The method for determining the default beam, the apparatus for determining the default beam, and the communication device are provided in the embodiment of the present disclosure. The one or multiple TCI states corresponding to the specific PDCCH are determined by a terminal device, and the default beam is determined according to the one or multiple TCI states corresponding to the specific PDCCH. Therefore, in case that the terminal device does not receive the beam indication signaling sent by a network side device, the terminal device may also determine the default beam, so as to communicate with the network side device based on the default beam, thus improving the communication success rate.

In order to implement the above-mentioned embodiments, the present disclosure also provides a computer storage medium.

The computer storage medium provided in the embodiment of the present disclosure having stored therein executable programs that, when executed by a processor, cause the above-mentioned method for determining the uplink transmission resource, for example, as shown in at least one of FIGS. 1 to 11, to be implemented.

Figure 13:
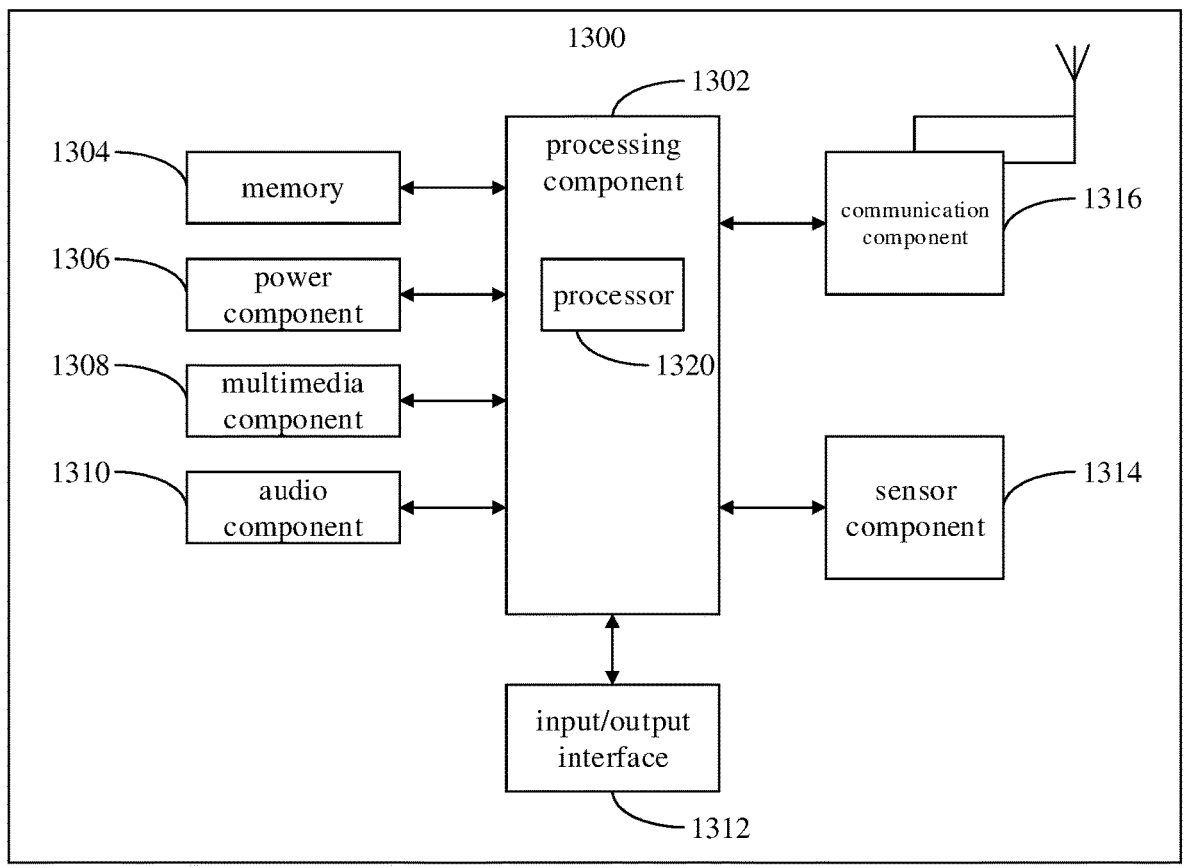
FIG. 13 is a block diagram of a terminal device provided in an embodiment of the present disclosure.

FIG. 13 is a block diagram of a terminal device 1300 provided in an embodiment of the present disclosure. For example, the terminal device 1300 can be a mobile phone, a computer, a digital broadcast user equipment, a messaging device, a game console, a tablet device, a medical device, a fitness device, a personal digital assistant, or the like.

Referring to FIG. 13, the terminal device 1300 may include at least of the following components: a processing component 1302, a memory 1304, a power component 1306, a multimedia component 1308, an audio component 1310, an input/output (I/O) interface 1313, a sensor component 1314, and a communication component 1316.

The processing component 1302 typically controls overall operations of the terminal device 1300, such as the operations associated with display, phone calls, data communications, camera operations, and recording operations. The processing component 1302 can include at least one processor 1320 to execute instructions to perform all or some of the steps in the above-described methods. Moreover, the processing component 1302 may include at least one module which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the terminal device 1300. Examples of such data include instructions for any applications or methods operated on the terminal device 1300, contact data, phonebook data, messages, pictures, videos, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the terminal device 1300. The power component 1306 may include a power management system, at least one power source, and any other components associated with the generation, management, and distribution of power in the terminal device 1300.

The multimedia component 1308 includes a screen providing an output interface between the terminal device 1300 and the user. In some embodiments, the screen may include a liquid crystal display (LCD) and a touch panel (TP). If the screen includes the touch panel, the screen may be implemented as a touch screen to receive input signals from the user. The touch panel includes at least one touch sensor to sense touches, swipes, and gestures on the touch panel. The touch sensors may not only sense a boundary of a touch or swipe action, but also sense a wake up time and a pressure associated with the touch or swipe action. In some embodiments, the multimedia component 1308 includes a front camera and/or a rear camera. The front camera and/or the rear camera may receive an external multimedia datum while the user equipment 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone (MIC) configured to receive an external audio signal when the user equipment 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1313 provides an interface between the processing component 1302 and peripheral interface modules, such as keyboards, click wheels, buttons, and the like. The buttons may include, but are not limited to, a home button, a volume button, a starting button, and a locking button.

The sensor component 1314 includes at least one sensor to provide status assessments of various aspects of the terminal device 1300. For instance, the sensor component 1314 may detect an open/closed status of the terminal device 1300, relative positioning of components, e.g., the display and the keypad, of the terminal device 1300, a change in position of the terminal device 1300 or a component of the terminal device 1300, a presence or absence of user contact with the terminal device 1300, an orientation or an acceleration/deceleration of the terminal device 1300, and a change in temperature of the terminal device 1300. The sensor component 1314 may include a proximity sensor configured to detect the presence of nearby objects without any physical contact. The sensor component 1314 may further include a light sensor, such as a CMOS or CCD image sensor, for use in imaging applications. In some embodiments, the sensor component 1314 may further include an accelerometer sensor, a gyroscope sensor, a magnetic sensor, a pressure sensor, or a temperature sensor.

The communication component 1316 is configured to facilitate communication, wired or wireless, between the terminal device 1300 and other devices. The terminal device 1300 can access a wireless network based on a communication standard, such as WiFi, 2G, or 3G, or a combination thereof. In an illustrative embodiment, the communication component 1316 receives a broadcast signal or broadcast associated information from an external broadcast management system via a broadcast channel. In an illustrative embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the terminal device 1300 may be implemented with at least one application specific integrated circuit (ASIC), a digital signal processor (DSP), a digital signal processing device (DSPD), a programmable logic device (PLD), a field programmable gate array (FPGA), a controller, a micro-controller, a microprocessor, or other electronic elements, for performing any one of the methods in the above-mentioned FIGS. 1 to 11.

In an illustrative embodiment, there is also provided a non-transitory computer readable storage medium including instructions, such as included in the memory 1304, executable by the processor 1320 in the terminal device 1300, for completing any one of the above-mentioned methods. For example, the non-transitory computer-readable storage medium may be a ROM, a random access memory (RAM), a CD-ROM, a magnetic tape, a floppy disc, an optical data storage device, and the like.

Other embodiments of the disclosure will be apparent to those skilled in the art from consideration of the specification and practice of the disclosure disclosed here. The present disclosure is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for determining a default beam, comprising:
   determining a physical downlink control channel (PDCCH) received on a control resource set (CORESET) satisfying a preset condition as a specific PDCCH;
   determining one or multiple transmission configuration indication (TCI) states corresponding to the specific PDCCH; and
   determining the default beam according to the one or multiple TCI states;
   wherein determining the one or multiple TCI states corresponding to the specific PDCCH comprises:
   determining one or multiple TCI states corresponding to the CORESET satisfying the preset condition as the one or multiple TCI states corresponding to the specific PDCCH.

2. The method of claim 1, wherein determining the default beam according to the one TCI state comprises:
   determining the default beam according to one TCI state corresponding to the PDCCH.

3. The method of claim 1, wherein determining the default beam according to the multiple TCI states comprises at least one of:
   determining one default beam according to one specific TCI state in the multiple TCI states; or
   determining multiple default beams according to the multiple TCI states.

4. The method of claim 3, wherein determining the one default beam according to the one specific TCI state in the multiple TCI states comprises:
   determining the one specific TCI state according to identifiers (IDs) of the multiple TCI states; and
   determining the one default beam according to the one specific TCI state.

5. The method of claim 3, wherein determining the one default beam according to the one specific TCI state in the multiple TCI states comprises:
   acquiring an ID of a search space set (SS SET) associated with the CORESET;
   determining a specific SS SET according to the ID of the SS SET, and determining a TCI state corresponding to the specific SS SET as the one specific TCI state; and
   determining the one default beam according to the one specific TCI state;
   wherein the specific PDCCH is received on the CORESET.

6. The method of claim 1, wherein:
   sequential mapping or cyclic mapping is enabled between multiple default beams and multiple transmission occasions.

7. The method of claim 1, further comprising:
   determining a CORESET corresponding to a specific serving cell; and
   determining a PDCCH received on the CORESET corresponding to the specific serving cell as the specific PDCCH.

8. The method of claim 7, wherein determining the one or multiple TCI states corresponding to the specific PDCCH comprises:
   determining one or multiple TCI states corresponding to the CORESET corresponding to the specific serving cell as the one or multiple TCI states corresponding to the specific PDCCH.

9. The method of claim 7, further comprising:
   determining a serving cell configured with a physical uplink control channel (PUCCH) resource; and
   determining the specific serving cell according to the serving cell configured with the PUCCH resource.

10. The method of claim 7, wherein the specific serving cell comprises at least one of a primary cell, a primary secondary cell, or a secondary cell.

11. The method of claim 1, wherein determining the one or multiple TCI states corresponding to the specific PDCCH comprises:
    determining one or multiple TCI states corresponding to one or more CORESETs corresponding to the specific PDCCH as the one or multiple TCI states corresponding to the specific PDCCH.

12. The method of claim 11, wherein the specific PDCCH is configured to schedule a specific communication transmission, and the default beam is configured for at least one of the specific communication transmission or carrying a PUCCH resource of hybrid automatic repeat request acknowledgement (HARQ ACK) feedback information.

13. The method of claim 12, wherein the specific communication transmission comprises at least one of:
   a communication transmission carried on a physical downlink shared channel (PDSCH);
   semi-persistent scheduling (SPS) release;
   an aperiodic channel state information reference signal (CSI-RS);
   a communication transmission carried on a physical uplink shared channel (PUSCH); or
   a communication transmission carried on a PUCCH.

14. The method of claim 1, wherein determining the one or multiple TCI states corresponding to the specific PDCCH comprises:
   receiving a downlink control information (DCI) signaling carried by the specific PDCCH;
   acquiring a specific codepoint configured to indicate a TCI state domain in the DCI signaling; and
   determining the one or multiple TCI states corresponding to the specific PDCCH according to the TCI state corresponding to the specific codepoint.

15. The method of claim 14, wherein the specific codepoint is one of:
   a smallest codepoint in multiple codepoints;
   a smallest codepoint in multiple codepoints of one TCI state corresponding to the TCI state domain;
   a smallest codepoint in multiple codepoints of two TCI states corresponding to the TCI state domain; or
   a current codepoint of the TCI state domain.

16. The method of claim 15, wherein the TCI state domain is configured to indicate a beam of at least one communication transmission.

17. A communication device, comprising:
   a transceiver;
   a memory; and
   a processor connected to the transceiver and the memory, respectively, and configured to:
   determine a physical downlink control channel (PDCCH) received on a control resource set (CORESET) satisfying a preset condition as a specific PDCCH;
   determine one or multiple transmission configuration indication (TCI) states corresponding to the CORESET satisfying the preset condition as one or multiple TCI states corresponding to the specific PDCCH; and
   determine a default beam according to the one or multiple TCI states.

18. The communication device of claim 17, wherein the processor is further configured to:
   determine one default beam according to one specific TCI state in the multiple TCI states; or
   determine multiple default beams according to the multiple TCI states.

19. The communication device of claim 17, wherein the specific PDCCH is configured to schedule a specific communication transmission, and the specific communication transmission comprises at least one of:
   a communication transmission carried on a physical downlink shared channel (PDSCH);
   semi-persistent scheduling (SPS) release;
   an aperiodic channel state information reference signal (CSI-RS);
   a communication transmission carried on a physical uplink shared channel (PUSCH); or
   a communication transmission carried on a PUCCH.

20. A non-transitory computer-readable storage medium having stored therein computer-executable instructions that, when executed by a processor of a communication device, cause the communication device to:
   determine a physical downlink control channel (PDCCH) received on a control resource set (CORESET) satisfying a preset condition as a specific PDCCH;
   determine one or multiple transmission configuration indication (TCI) states corresponding to the CORESET satisfying the preset condition as one or multiple TCI states corresponding to the specific PDCCH; and
   determine a default beam according to the one or multiple TCI states.

* * * * *